United States Patent
Hinoki et al.

(10) Patent No.: US 8,034,483 B2
(45) Date of Patent: Oct. 11, 2011

(54) ANODE AND LITHIUM-ION SECONDARY BATTERY

(75) Inventors: Kiyonori Hinoki, Tokyo (JP); Yousuke Miyaki, Tokyo (JP); Kazuo Katai, Tokyo (JP)

(73) Assignee: TDK Corporation, Tokyo (JP)

( * ) Notice: Subject to any disclaimer, the term of this patent is extended or adjusted under 35 U.S.C. 154(b) by 637 days.

(21) Appl. No.: 12/053,162

(22) Filed: Mar. 21, 2008

(65) Prior Publication Data

US 2008/0241685 A1 Oct. 2, 2008

(30) Foreign Application Priority Data

Mar. 29, 2007 (JP) ................ P2007-088634

(51) Int. Cl.
  *H01M 4/13* (2010.01)
  *H01M 4/60* (2010.01)
  *H01M 4/62* (2010.01)
(52) U.S. Cl. ........ 429/212; 429/213; 429/215; 429/232; 429/231.95
(58) Field of Classification Search .................. 429/209, 429/212, 213, 216, 218.1, 232, 231.95, 215
  See application file for complete search history.

(56) References Cited

U.S. PATENT DOCUMENTS 4,960,655 A * 10/1990 Hope et al. .................... 429/304

FOREIGN PATENT DOCUMENTS

| JP | A-8-138650 | | 5/1996 |
|---|---|---|---|
| JP | 08-153514 | * | 6/1996 |
| JP | A-11-126600 | | 5/1999 |
| JP | A-2000-251890 | | 9/2000 |
| JP | A-2003-142075 | | 5/2003 |
| JP | A-2004-127913 | | 4/2004 |
| JP | A-2005-063955 | | 3/2005 |
| JP | A-2005-222933 | | 8/2005 |
| JP | A-2005-317493 | | 11/2005 |
| JP | A-2008-34346 | | 2/2008 |
| WO | WO 2005/013400 A2 | | 2/2005 |
| WO | WO 2008/001535 A1 | | 1/2008 |

OTHER PUBLICATIONS

Sep. 8, 2009 Office Action issued in Japanese Patent Application No. 2007-088634.
Dec. 14, 2010 Office Action issued in Chinese Application No. 200810086923.8 (translation).

* cited by examiner

*Primary Examiner* — Patrick Ryan
(74) *Attorney, Agent, or Firm* — Oliff & Berridge, PLC

(57) ABSTRACT

An anode for lithium-ion secondary battery is provided as one capable of ensuring sufficient safety (suppression of dendrites) while achieving a higher capacity (higher density of the electrode), and permitting formation of a lithium-ion secondary battery with excellent high-rate discharge performance. An anode for lithium-ion secondary battery has a current collector, and an active material-containing layer formed on the current collector, the active material-containing layer is comprised of an outermost layer disposed on the farthest side from the current collector, and a lower layer composed of at least one layer disposed between the outermost layer and the current collector, and a degree of flexion of the outermost layer is smaller than that of the lower layer.

13 Claims, 11 Drawing Sheets

ANODE AND LITHIUM-ION SECONDARY BATTERY

BACKGROUND OF THE INVENTION

1. Field of the Invention

The present invention relates to an anode and a lithium-ion secondary battery.

2. Related Background Art

In recent years, there are increasing demands for higher capacities of electrodes in the lithium-ion secondary batteries. For achieving a higher capacity of an electrode, it was common practice in the conventional technology to increase the packing density of the electrode by adjusting processing conditions in fabrication of the electrode, e.g., by increasing the press pressure or the like, and thereby to increase the capacity per volume (e.g., cf Japanese Patent Application Laid-open Nos. 2005-63955, 2004-127913, 2005-317493, 2000-251890, 2003-142075, and 2005-222933).

However, the increase in press pressure comes to pose a problem that the active material in the electrode (particularly, the active material on the surface side of the electrode) is crushed to become flat, so as to decrease the number of voids in the electrode whereby flow paths of an electrolyte solution are closed. When the flow paths of the electrolyte solution are closed, lithium ions remain on the surface of the electrode to promote generation of dendrites. With generation of dendrites, a short circuit might occur between electrodes so as to raise a risk of ignition or the like.

SUMMARY OF THE INVENTION

The present invention has been accomplished in view of the problem of the conventional technology and an object of the invention is to provide an anode for lithium-ion secondary battery enabling formation of a lithium-ion secondary battery with excellent high-rate discharge performance, while achieving a higher capacity (higher density of the electrode) and ensuring sufficient safety (suppression of dendrites), and to provide a lithium-ion secondary battery.

In order to achieve the above object, the present invention provides an anode for lithium-ion secondary battery comprising a current collector, and an active material-containing layer formed on the current collector, wherein the active material-containing layer is comprised of an outermost layer disposed on the farthest side from the current collector, and a lower layer composed of at least one layer disposed between the outermost layer and the current collector; and wherein a degree of flexion of the outermost layer is smaller than a degree of flexion of the lower layer.

Since is anode comprises the active material-containing layer comprised of the outermost layer and the lower layer with the different degrees of flexion, the lower layer with the larger degree of flexion contributes to increase in electric capacity, while the outermost layer with the smaller degree of flexion ensures flow paths of an electrolyte solution to prevent lithium ions from remaining on the surface of the electrode and thereby to suppress the generation of dendrites. Therefore, when this anode is applied to a lithium-ion secondary battery, it is able to ensure sufficient safety (suppression of dendrites) while achieving a higher capacity of the battery (higher density of the electrode), and to ensure flow paths of the electrolyte solution in the outermost layer so as to achieve excellent high-rate discharge performance.

In the anode of the present invention, the degree of flexion of the outermost layer is preferably not less than 1.3 nor more than 2.0. When the degree of flexion of the outermost layer is in the foregoing range, it is feasible to more adequately prevent lithium ions from remaining on the surface of the electrode and thus to more reliably suppress the generation of dendrites.

On the other hand, in the anode of the present invention, the degree of flexion of the lower layer is preferably not less than 2.5 nor more than 4.0. When the degree of flexion of the lower layer is in the foregoing range, the electric capacity is increased more.

In the anode of the present invention, a thickness of the outermost layer is preferably smaller than a thickness of the lower layer. This adequately suppresses the generation of dendrites and increases the electric capacity more.

Furthermore, in the anode of the present invention, preferably, the thickness of the outermost layer is not less than 5 μm nor more than 40 μm and the thickness of the lower layer is not less than 40 μm nor more than 100 μm. This suppresses the generation of dendrites more adequately and increases the electric capacity still more.

The present invention also provides a lithium-ion secondary battery comprising an anode, a cathode, and an electrolyte layer disposed between the anode and the cathode, wherein the anode is the aforementioned anode of the present invention.

In the present specification, the "anode" and "cathode" are determined based on the polarities during discharge of the lithium-ion secondary battery for convenience' sake of description. Therefore, the "anode" serves as a "cathode" and the "cathode" as an "anode" during charge.

Since the lithium-ion secondary battery is constructed using the anode of the present invention with the aforementioned effect, it is able to offer an excellent electric capacity and to adequately suppress the generation of dendrites.

The present invention provides the anode for lithium-ion secondary battery being capable of ensuring the sufficient safety (suppression of dendrites) while achieving the higher capacity (higher density of the electrode), and enabling formation of a lithium-ion secondary battery with excellent high-rate discharge performance, and the lithium-ion secondary battery.

DESCRIPTION OF THE PREFERRED EMBODIMENTS

Figure 1:
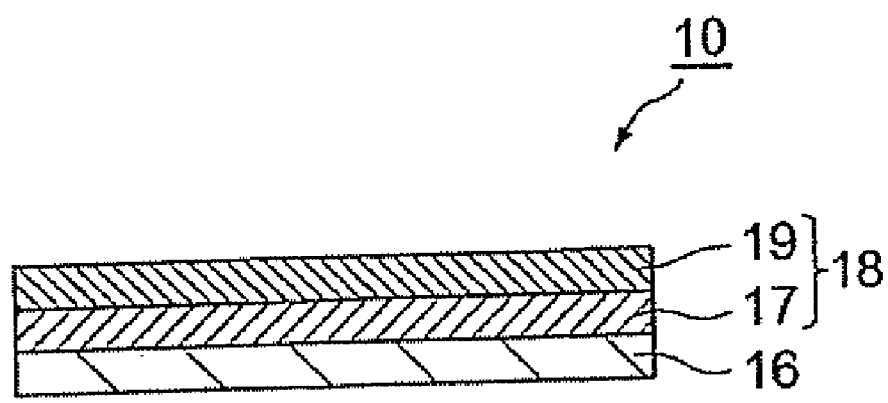
FIG. 1 is a schematic sectional view showing a basic configuration of an anode for lithium-ion secondary battery according to the present invention.

The preferred embodiments of the present invention will be described below in detail with reference to the drawings. Identical or equivalent portions will be denoted by the same reference symbols in the drawings, without redundant description. The vertical, horizontal, and other positional relations are based on those in the drawings unless otherwise stated in particular. Furthermore, the dimensional ratios in the drawings are not limited to those illustrated.

An anode for lithium-ion secondary battery according to the present invention is one comprising a current collector, and an active material-containing layer formed on the current collector, wherein the active material-containing layer is comprised of an outermost layer disposed on the farthest side from the current collector, and a lower layer composed of at least one layer disposed between the outermost layer and the current collector, and wherein a degree of flexion of the outermost layer is smaller than a degree of flexion of the lower layer.

FIG. 1 is a schematic sectional view showing a basic configuration of an anode for the lithium-ion secondary battery according to the present invention. As shown in FIG. 1, the anode 10 is composed of a current collector 16, and an active material-containing layer 18 formed on the current collector 16. The active material-containing layer 18 is comprised of an outermost layer 19 disposed on the farthest side from the current collector 16, and a lower layer 17 disposed between the outermost layer 19 and the current collector 16. The lower layer 17 may consist of one layer as shown in FIG. 1, or may consist of two or more layers. In the anode 10, the degree of flexion of the outermost layer 19 is smaller than the degree of flexion of the lower layer 17.

Figure 2:
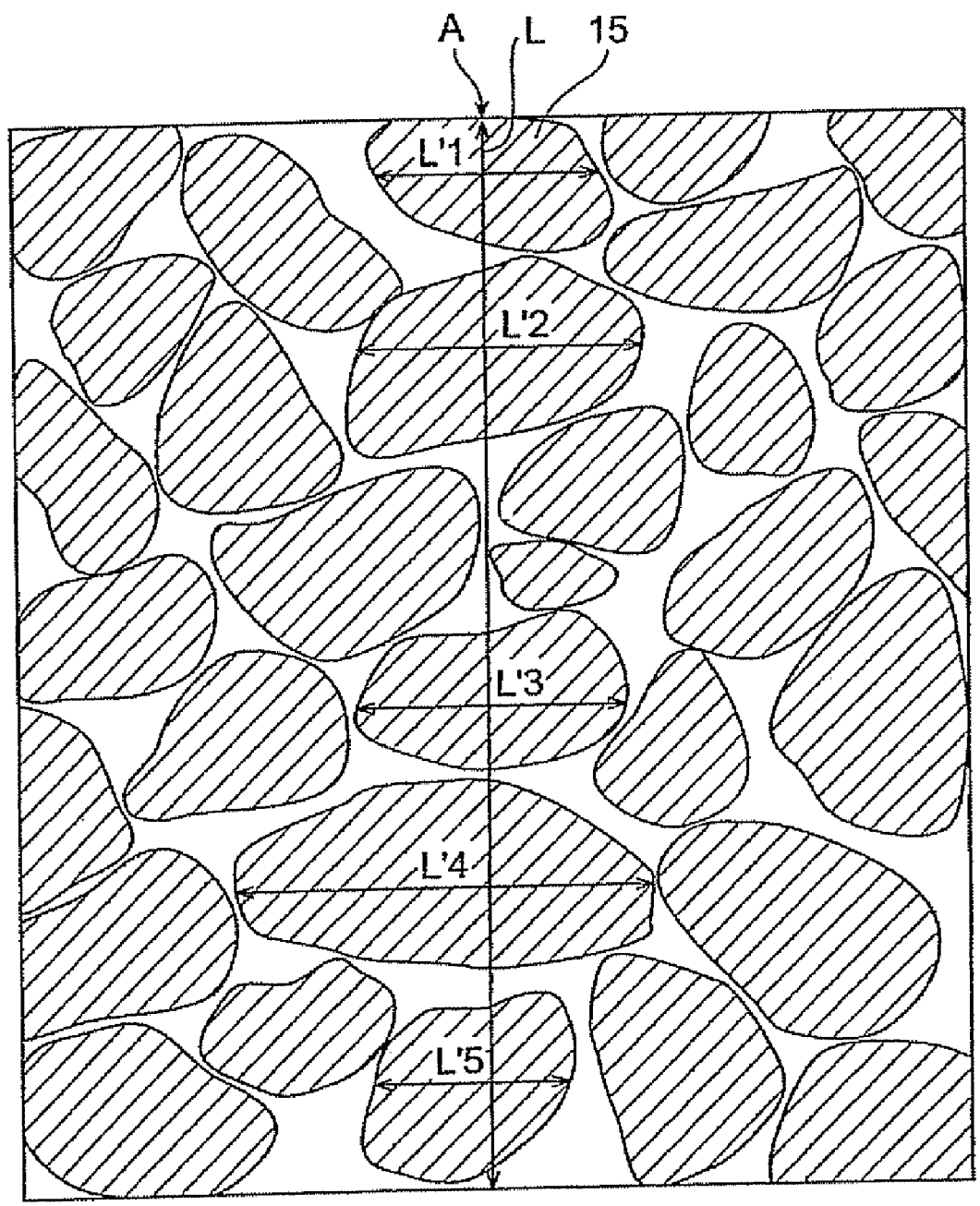
FIG. 2 is a schematic sectional view of an outermost layer in the anode for lithium-ion secondary battery according to the present invention.

In the present invention the degree of flexion is determined as follows, FIG. 2 is a schematic sectional view of the outermost layer 19. As shown in FIGS. 2, the outermost layer 19 has a structure in which active material particles 15 are bound by a binder (not shown). The degree of flexion is a value obtained by drawing a straight line A perpendicular to the outermost layer 19 (i.e., parallel to the thickness direction), defining L as a length of the straight line, defining L' (in the same unit as L) as a numerical value of the sum of maximum diameters in the lateral direction (direction perpendicular to the foregoing straight line A) of active material particles 15 crossing the straight line A, and calculating a ratio (L'/L). For example, in FIG. 2, there are five active material particles 15 crossing the straight line A and the lateral maximum diameters thereof are L'1, L'2, L'3, L'4, and L'5, respectively. Therefore, the degree of flexion is determined by $\{(L'1+L'2+L'3+L'4+L'5)/L\}$.

For actually measuring the degree of flexion, a scanning electron microscope (SEM) photograph of a cross section of the outermost layer 19 is taken at each of ten random points for each sample, the straight line A is drawn perpendicularly to the outermost layer 19 in the center of each of those SEM photographs, the length L of the straight Line A and the sum L' of lateral maximum diameters of active material particles 15 crossing the straight line A are measured in each photograph, the value of (L'/L) is calculated in each photograph, and an average of calculated values (L'/L) for the ten points is determined as the degree of flexion. It is noted that each SEM photograph should be taken so as to cover the whole thickness of the outermost layer 19. Namely, the value L is equivalent to the thickness of the outermost layer 19.

For the lower layer 17, the degree of flexion thereof is also measured in the same manner as in the above-described case of the outermost layer 19. In cases where the lower layer 17 is comprised of two or more layers, each SEM photograph is also taken so as to cover the whole thickness of the lower layer 17 comprised of the two or more layers and the degree of flexion of the entire lower layer 17 is measured by the same technique. In the present invention the degrees of flexion are values measured with the anode in an uncharged state.

The degree of flexion of the outermost layer 19 needs to be smaller a the degree of flexion of the lower layer 17, and a specific value thereof is preferably not less than 1.3 nor more than 2.0 and more preferably not less than 1.5 nor more than 1.9. If the degree of flexion of the outermost layer 19 is set below 1.3, production thereof tends to become hard; for example, the press pressure during formation of the electrode needs to be very low. On the other hand, if the degree of flexion of the outermost layer 19 exceeds 2.0, lithium ions become likely to remain on the surface of the electrode and the effect to suppress the generation of dendrites tends to degrade.

The degree of flexion of the lower layer 17 needs to be larger than the degree of flexion of the outermost layer 19, and a specific value thereof is preferably not less than 2.5 nor more than 4.0 and more preferably not less than 2.7 nor more than 3.8. If the degree of flexion of the lower layer 17 is less than 2.5, the increasing effect of electric capacity tends to degrade. On the other hand, if the degree of flexion of the lower layer 17 is set to be larger than 4.0, the press pressure, e.g., during formation of the electrode needs to be very high and the electrode tends to deform easily.

Each of constituent materials of the anode 10 will be described below.

There are no particular restrictions on the current collector 16 as long as it is a good conductor capable of implementing adequate movement of charge to the active material-containing layer 18. The current collector 16 can be one of the current collectors used in the well-known lithium-ion secondary batteries. For example, the current collector 16 can be a metal foil of copper, aluminum, or the like.

The outermost layer 19 is composed mainly of active material particles, and a binder. The outermost layer 19 may further contain a conductive aid.

There are no particular restrictions on the active material particles used in the outermost layer 19, as long as they can implement reversible progress of occlusion and release of lithium ions, desorption and insertion (intercalation) of lithium ions, or doping and dedoping with lithium ions and counter anions thereto (e.g., $ClO_4^-$). The active material particles can be well-known anode active material particles. Such active material particles can be, for example, particles of one selected from carbon materials such as natural graphite and artificial graphite (non-graphitizing carbon, graphitizing carbon, low temperature-calcined carbon, etc.), metals such as Al, Si, and Sn capable of combining with lithium, amorphous compounds consisting mainly of an oxide such as $SiO_2$ or $SnO_2$, and lithium titanate ($Li_4Ti_5O_{12}$). Among them, the carbon materials are preferably applicable, and the active material particles are more preferably those with the interlayer distance $d_{002}$ of the carbon material being 0.335-0.338 nm and the crystallite size $Lc_{002}$ of the carbon material being 30-120 nm. The carbon materials satisfying these conditions include artificial graphite, MCF (mesocarbon fiber), and so on. The interlayer distance $d_{002}$ and the crystallite size $Lc_{002}$ can be obtained by X-ray diffactometry.

From the viewpoint of making the degree of flexion of the outermost layer 19 smaller, it is also preferable to use activated carbon as the active material particles. Other applicable materials include metal oxides, porous materials (ceramics, organic particles, etc.), and so on. These materials are resistant to deformation or the like due to press during formation of the electrode and the degree of flexion of the outermost layer 19 can be kept low. These materials may be used singly or in combination with the aforementioned well-known anode active material particles.

The average particle size (D50) of the active material particles used in the outermost layer 19 is preferably not less than 3 μm nor more than 40 μm and more preferably not less than 5 μm nor more than 30 μm. If the average particle size is less than 3 μm, it becomes hard to disperse the active material particles and it tends to become difficult to form a uniform coating film; if the average particle size exceeds 40 μm, the thickness of the coating film tends to exceed 40 μm.

Any one of the well-known binders can be used as the binder used in the outermost layer 19, without any particular restrictions, and examples thereof include fluorocarbon polymers such as polyvinylidene fluoride (PVDF), polytetrafluoroethylene (PTFE), a tetrafluoroethylene-hexafluoro propylene copolymer (FEP), a tetrafluoroethylene-perfluoroalkylvinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF). This binder binds the constituent materials, e.g., the active material particles and constituent materials such as the conductive aid added if necessary, together and also contributes to binding between those constituent materials and the current collector.

Besides the above examples, the binder may be, for example, one of vinylidene fluoride-based fluororubbers such as vinylidene fluoride-hexafluoropropylene fluororubber (VDF-HFP fluororubber), vinylidene fluoride-hexafluoropropylene-tetrafluoroethylene fluororubber (VDF-HFP-TFE fluororubber), vinylidene fluoride-pentafluoropropylene fluororubber (VDF-PFP fluororubber), vinylidene fluoride-pentafluoropropylene-tetrafluoroethylene fluororubber (VDF-PFP-TFE fluororubber), vinylidene fluoride-perfluoromethylvinylether-tetrafluoroethylene fluororubber (VDF-PFMVE-TFE fluororubber), and vinylidene fluoride-chlorotrifluoroethylene fluororubber (VDF-CTFE fluororubber).

Furthermore, in addition to the above examples, the binder may also be, for example, one of polyethylene, polypropylene, polyethylene terephthalate, aromatic polyamide, cellulose, styrene-butadiene rubber, isoprene rubber, butadiene rubber, and ethylene-propylene rubber. The binder may also be one of thermoplastic elastomer polymers such as styrene-butadiene-styrene block copolymers and hydrogenated derivatives thereof, styrene-ethylene-butadiene-styrene copolymers, and styrene-isoprene-styrene block copolymers and hydrogenated derivatives thereof. Furthermore, the binder may be one of syndiotactic 1,2-polybutadiene, ethylene-vinyl acetate copolymers, and propylene-α-olefin (C2-C12 olefin) copolymers. In addition, it may be one of electrically-conductive polymers.

There are no particular restrictions on the conductive aid used according to need in the outermost layer 19, and the conductive aid can be any one of the well-known conductive aids. Examples of such conductive aids include carbon blacks, carbon materials, fine powders of metals such as copper, nickel, stainless steel, and iron, mixtures of the carbon materials and the fine powders of metals, and electrically conductive oxides such as ITO.

The content of the active material particles in the outermost layer 19 is preferably not less than 80% by mass nor more than 97% by mass, based on the total solid content of the outermost layer 19, and more preferably not less than 85% by mass nor more than 95% by mass. If this content is less than 80% by mass, the density of the active material becomes lower and the electric capacity tends to decrease; if the content exceeds 97% by mass, the amount of the binder becomes relatively smaller and the coating film tends to become fragile.

The thickness of the outermost layer 19 is preferably smaller an that of the lower layer 17. Specifically, the thickness of the outermost layer 19 is preferably not less than 3 μm nor more than 40 μm and more preferably not less than 5 μm nor more than 35 μm. If this thickness is less than 3 μm, the active material particles with small particle sizes must be selected and it tends to become difficult to form a coating film; if the thickness exceeds 40 μm, the density of the coating film becomes smaller and the resistance tends to increase.

The lower layer 17 is composed mainly of active material particles, and a binder as the aforementioned outermost layer 19 is. The lower layer 17 may further contain a conductive aid.

The binder and the conductive aid used in the lower layer 17 can be the same as those in the outermost layer 19.

There are no particular restrictions on the active material particles used in the lower layer 17, as long as they can implement reversible progress of occlusion and release of lithium ions, desorption and insertion (intercalation) of lithium ions, or doping and dedoping with lithium ions and counter anions thereto (e.g., $ClO_4^-$). The active material particles can be well-known anode active material particles. Such active material particles can be, for example, particles of one selected from carbon materials such as natural graphite and artificial graphite (non-graphitizing carbon, graphitizing carbon, low temperature-calcined carbon, etc.), metals such as Al, Si, and Sn capable of combining with lithium, amorphous compounds consisting mainly of an oxide such as $SiO_2$ or $SnO_2$, and lithium titanate ($Li_4Ti_5O_{12}$). Among them, the carbon materials are preferably applicable, and the active material particles are more preferably those with the interlayer distance $d_{002}$ of the carbon material being 0.335-0.338 nm and the crystallite size $Lc_{002}$ of the carbon material being 30-120 nm. The carbon materials satisfying these conditions include artificial graphite, MCF (mesocarbon fiber), and so on. The interlayer distance $d_{002}$ and the crystallite size $Lc_{002}$ can be obtained by X-ray diffractometry.

The average particle size (D50) of the active material particles used in the lower layer 17 is preferably not less than 10 μm nor more than 40 μm and more preferably not less than 12 μm nor more than 35 μm. If the average particle size is less than 10 μm, it becomes hard to disperse the active material particles and it tends to become difficult to form a uniform coating film; if the average particle size exceeds 40 μm, the density of the coating film tends to decrease.

The content of the active material particles in the lower layer 17 is preferably not less than 80% by mass nor more than 97% by mass, based on the total solid content of the lower layer 17, and more preferably not less than 85% by mass nor more than 95% by mass. If this content is less than 80% by mass, the density of the active material becomes lower and the electric capacity tends to decrease; if the content exceeds 97% by mass, the amount of the binder becomes relatively smaller and adhesion tends to degrade between the coating film and the current collector.

The thickness of the lower layer 17 is preferably larger than that of the outermost layer 19. Specifically, the thickness of the lower layer 17 is preferably not less than 40 μm nor more than 100 μm and more preferably not less than 50 μm nor more than 90 μm. If this thickness is less than 40 μm, the electric capacity tends to decrease; if the thickness exceeds 100 μm, flow paths of the electrolyte solution are blocked to degrade the high-rate discharge performance and the bond strength tends to decrease between the coating film and the current collector.

For producing the anode 10, first, the aforementioned constituents are mixed and dispersed in a solvent in which the binder can be dissolved, thereby preparing each of a coating solution (slurry or paste or the, like) for formation of the lower layer and a coating solution (slurry or paste or the like) for formation of the outermost layer. There are no particular restrictions on the solvent as long as the binder can be dissolved in the solvent. Examples of such solvents include N-methyl-2-pyrrolidone, N,N-dimethylformamide, and so on.

Next, the coating solution for formation of the lower layer is applied onto the surface of the current collector 16, and dried, and the resultant is pressed to form the lower layer 17 on the current collector 16. Where the lower layer 17 consists of a plurality of layers, coating solutions are prepared corresponding to the respective layers, applied, dried, and pressed to form the respective layers.

Next, the coating solution for formation of the outermost layer is applied onto the surface of the lower layer 17, and dried, and the resultant is pressed to form the outermost layer 19 on the lower layer 17. This completes production of the anode 10 in which the active material-containing layer 18 is formed on the current collector 16.

Examples of application in the application of the coating solution for formation of the lower layer and the coating solution for formation of the outermost layer include metal mask printing, electrostatic coating, dip coating, spray coating, roll coating, a doctor blade methods gravure coating, screen printing, and so on.

The press is implemented, for example, by roll press such as calendering, platen press, or the like and it is desirable in the present invention to use the roll press advantageous in achievement of higher density of the electrode. If processing under high pressure causes such influence as deformation of an anode electrode sheet, the sheet may be hot-pressed under low pressure. In the case of the hot press, the conditions are properly adjusted in consideration of heat resistance of the binder. The temperature during the hot press is normally preferably in the range of 80 to 180° C. The pressure during the press is properly adjusted according to the constituent materials of the respective layers and others so as to satisfy the aforementioned condition for the degrees of flexion of the lower layer 17 and the outermost layer 19. The pressure during the press of the lower layer 17 is normally preferably set to the linear pressure of 2452-9807 N/cm (250-1000 kgf/cm) and more preferably to the linear pressure of 2746-7845 N/cm (280-800 kgf/cm). On the other hand, the pressure during the press of the outermost layer 19 is normally preferably set to the linear pressure of 245-14710 N/cm (25-1500 kgf/cm) and more preferably to the linear pressure of 343-12749 N/cm (35-1300 kgf/cm). In cases where the active material particles of the outermost layer 19 are made of a hard material resistant to deformation during the press like activated carbon, the press pressure in formation of the outermost layer 19 may be set higher than the press pressure during formation of the lower layer 17. The anode of the present invention is preferably produced according to the following procedure: the coating solution for formation of the lower layer is applied onto the current collector 16, dried and pressed to form the lower layer 17; thereafter the coating solution for formation of the outermost layer is applied onto the lower layer 17, dried, and pressed under the pressure lower than that during the formation of the lower layer 17, to form the outermost layer 19. Another applicable procedure is such that each of the coating solutions is applied onto the current collector 16 and dried to form the unpressed lower layer and outermost layer and then they are pressed together. It is noted that the porosity, density, and degree of flexion of the resulting layer can be adjusted by controlling the linear pressure during the press.

A lithium-ion secondary battery of the present invention will be described below. The lithium-ion secondary battery of the present invention has an anode, a cathode, and an electrolyte layer disposed between the anode and the cathode, and the anode is the aforementioned anode of the present invention.

Figure 3:
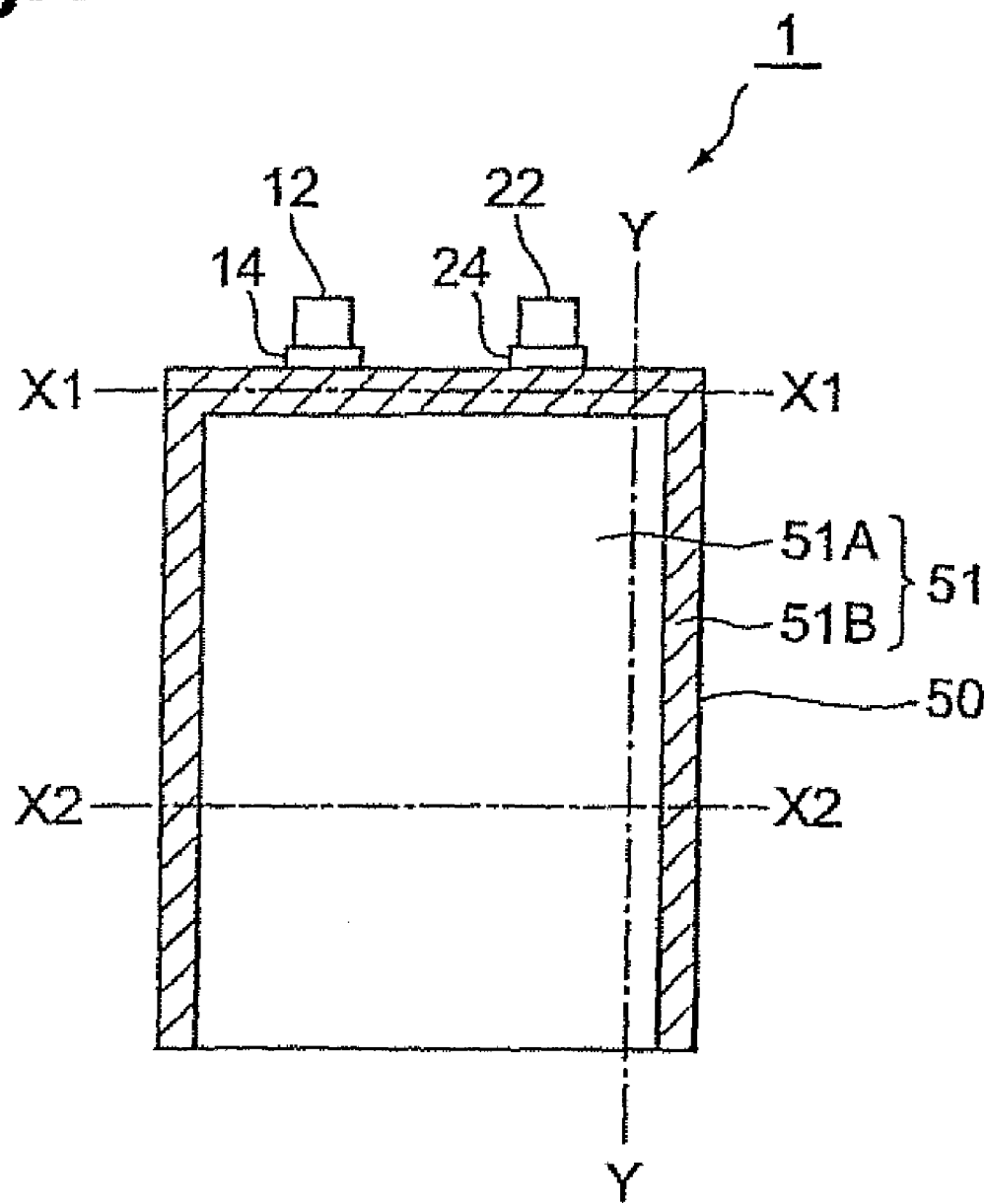
FIG. 3 is a front view showing a preferred embodiment of the lithium-ion secondary battery according to the present invention.
Figure 4:
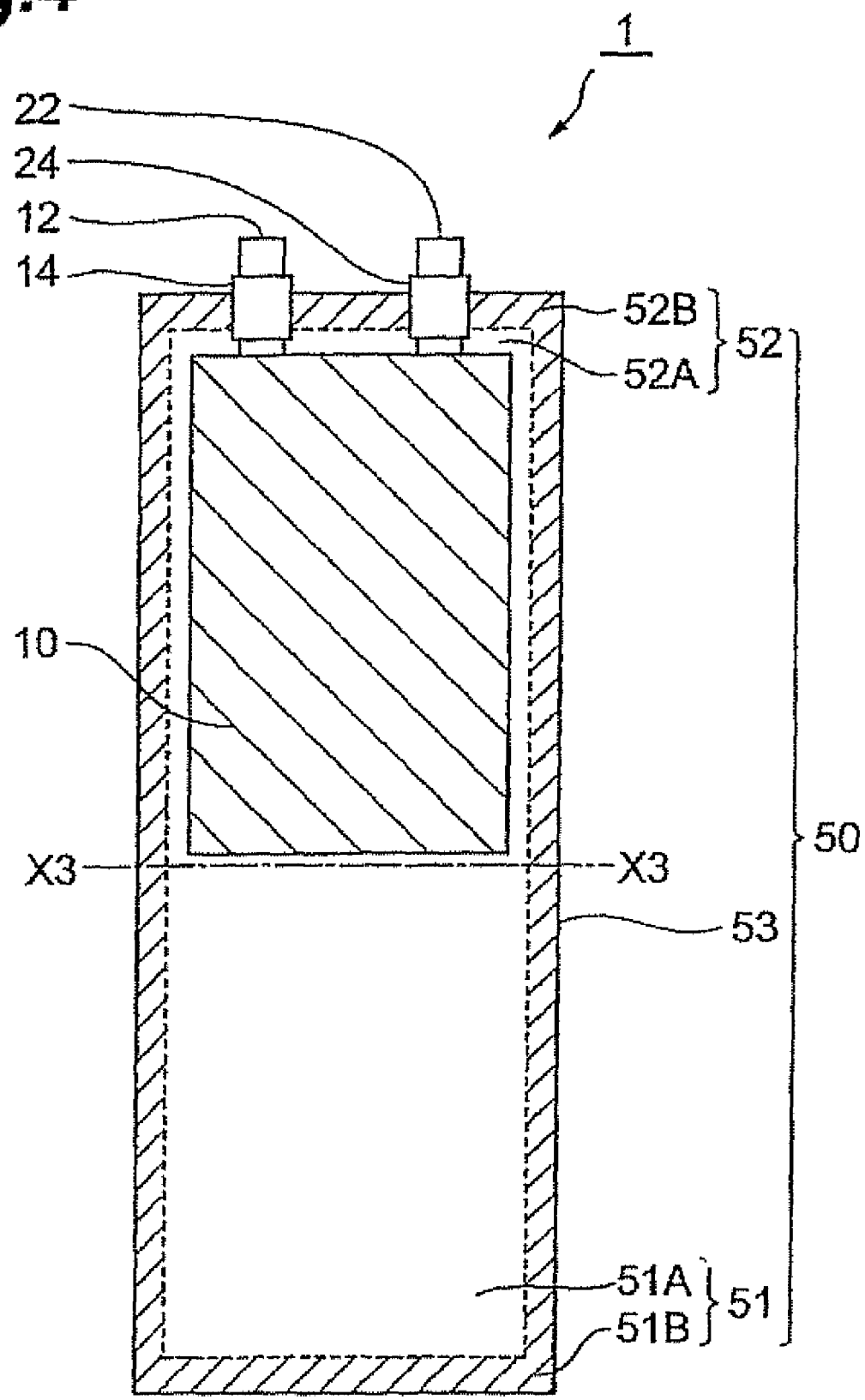
FIG. 4 is a development view in which the interior of the lithium-ion secondary battery shown in FIG. 3 is viewed from a direction of a normal to the surface of anode 10.
Figure 5:
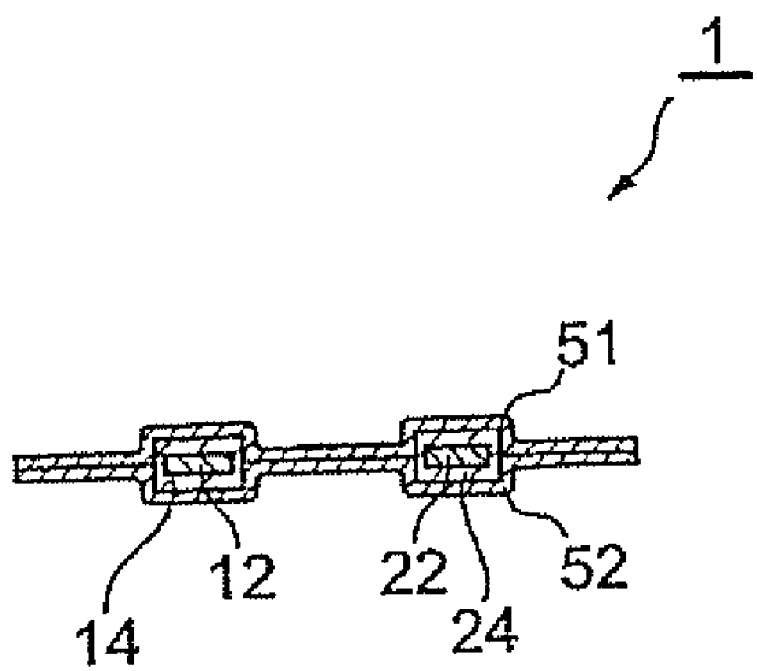
FIG. 5 is a schematic sectional view obtained by cutting the lithium-ion secondary battery shown in FIG. 3, along line X1-X1 in FIG. 3.
Figure 6:
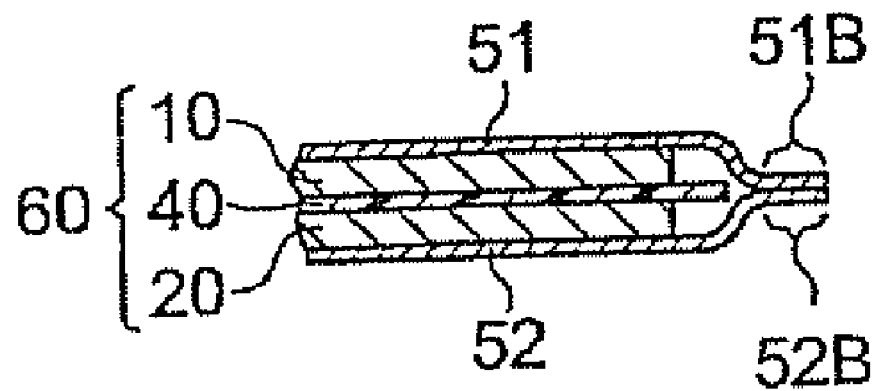
FIG. 6 is a schematic sectional view of the major part obtained by cutting the lithium-ion secondary battery shown in FIG. 3, along line X2-X2 in FIG. 3.
Figure 7:
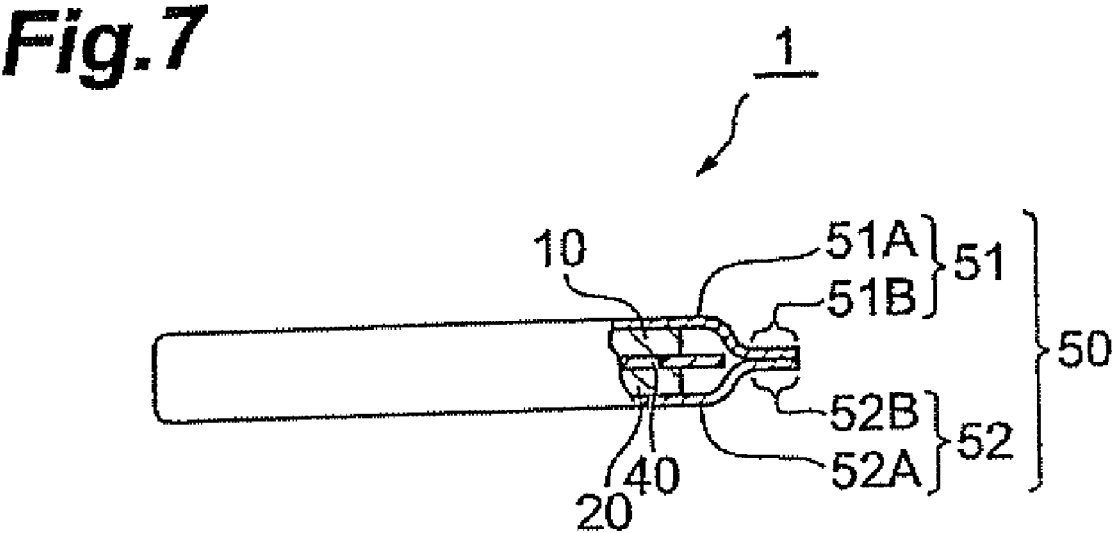
FIG. 7 is a schematic sectional view of the major part obtained by cutting the lithium-ion secondary battery shown in FIG. 3) along line Y-Y in FIG. 3.

FIG. 3 is a front view showing a preferred embodiment of the lithium-ion secondary battery of the present invention. FIG. 4 is a development view in which the interior of the lithium-ion secondary battery shown in FIG. 3 is viewed from a direction of a normal to the surface of the anode 10. Furthermore, FIG. 5 is a schematic sectional view obtained by cutting the lithium-ion secondary battery shown in FIG. 3, along line X1-X1 in FIG. 3. FIG. 6 is a schematic sectional view of the major part obtained by cutting the lithium-ion secondary battery shown in FIG. 3, along line X2-X2 in FIG. 3. FIG. 7 is a schematic sectional view of the major part obtained by cutting the lithium-ion secondary battery shown in FIG. 3, along line Y-Y in FIG. 3.

As shown in FIGS. 3 to 7, the lithium-ion secondary battery 1 is composed mainly of a platelike anode 10 and a platelike cathode 20 facing each other, a platelike separator 40 arranged in proximity to and between the anode 10 and the cathode 20, an electrolyte solution (nonaqueous electrolyte solution in the present embodiment) containing lithium ions, a case 50 housing these in a hermetically closed state, an anode lead 12 one end of which is electrically connected to the anode 10 and the other end of which is projecting outward from the case 50, and a cathode lead 22 one end of which is electrically connected to the cathode 20 and the other end of which is projecting outward from the case 50.

The anode 10 herein is the above-described anode 10 of the present invention.

Figure 10:
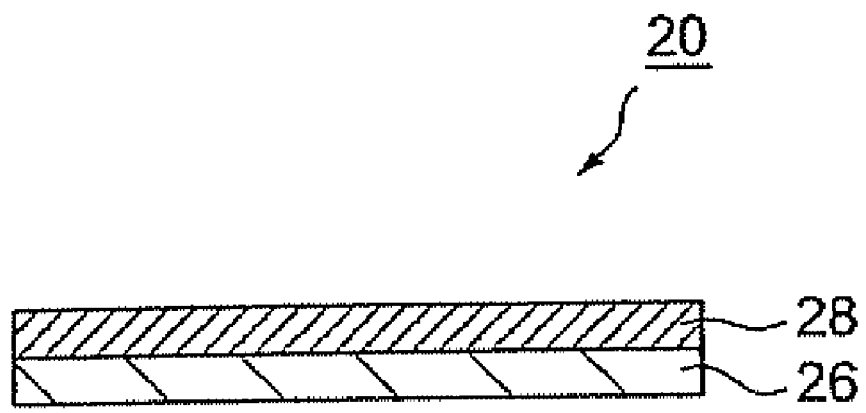
FIG. 10 is a schematic sectional view showing an example of a basic configuration of a cathode 20 in the lithium-ion secondary battery shown in FIG. 3.

FIG. 10 is a schematic sectional view showing an example of the basic configuration of the cathode 20 in the lithium-ion secondary battery 1 shown in FIG. 3. As shown in FIG. 10, the cathode 20 is composed of a current collector 26, and a cathode active material-containing layer 28 formed on the current collector 26.

There are no particular restrictions on the current collector 26 as long as it is a good conductor capable of implementing adequate movement of charge to the cathode material-containing layer 28. The current collector 26 can be one of the current collectors used in the well-known lithium-ion secondary batteries. For example, the current collector 26 can be a metal foil of copper, aluminum, or the like.

The cathode active material-containing layer 28 is composed mainly of a cathode active material and a binder The cathode active material-containing layer 28 preferably further contains a conductive aid.

There are no particular restrictions on the cathode active material as long as it can implement reversible progress of occlusion and release of lithium ions, desorption and insertion (intercalation) of lithium ions, or doping and dedoping with lithium ions and counter anions (e.g., $ClO_4^-$) to the lithium ions. The cathode active material can be one of the known electrode active materials. Examples thereof include lithium cobaltate ($LiCoO_2$), lithium nickelate ($LiNiO_2$), lithium manganese spinel ($LiMn_2O_4$), and composite metal oxides represented by general formula: $LiNi_xCo_yMn_zO_2$ (x+y+z=1), and composite metal oxides such as lithium vanadium compounds ($LiV_2O_5$), olivine type $LiMPO_4$ (where M is Co, Ni, Mn, or Fe), and lithium titanate $Li_4Ti_5O_{12}$).

The binder used in the cathode 20 can be the same as the binder used in the anode 10. The conductive aid used according to need in the cathode 20 can be the same as the conductive aid used in the anode 10.

The current collector of the cathode 20 is electrically connected to one end of the cathode lead 22, for example, made of aluminum and the other end of the cathode lead 22 extends outward from the case 50. On the other hand, the current collector of the anode 10 is also electrically connected to one end of the anode lead 12, for example, made of copper or nickel, and the other end of the anode lead 12 extends outward from the case 50.

There are no particular restrictions on the separator 40 disposed between the anode 10 and the cathode 20, as long as it is made of a porous material having ion permeability and electrical insulation. The separator 40 can be one of the separators used in the well-known lithium-ion secondary batteries. Examples of such separators 40 include film laminates of polyethylene, polypropylene, or polyolefin, stretched films of mixtures of the foregoing polymers, nonwoven fabric of fiber consisting of at least one constituent material selected from the group consisting of cellulose, polyester, and polypropylene, and so on.

The electrolyte solution (not shown) is filled in the interior space of the case 50 and part thereof is contained in the interior of the anode 10, cathode 20, and separator 40. The electrolyte solution used herein is a nonaqueous electrolyte solution in which a lithium salt is dissolved in an organic solvent. The lithium salt used herein is, for example, one of salts such as $LiPF_6$, $LiClO_4$, $LiBF_4$, $LiAsF_6$, $LiCF_3SO_3$, $LiCF_3$, $LiCF_2SO_3$, $LiC(CF_3SO_2)_3$, $LiN(CP_3SO_2)_2$, $LiN(CF_3CF_2SO_2)_2$, $LiN(CF_3SO_2)(C_4F_9SO_2)$, and $LiN(CF_3CF_2CO)_2$. These salts may be used singly or in combination of two or more. The electrolyte solution may be used in a gel form with an additive of a polymer or the like.

The organic solvent used herein can be one of solvents used in the well-known lithium-ion secondary batteries. Examples of solvents preferably applicable include propylene carbonate, ethylene carbonate, and diethylcarbonate. These may be used singly or as a mixture of two or more at any ratio.

The case 50 is made of a pair of films (first film 51 and second film 52) opposed to each other. It is noted herein that the first film 51 and the second film 52 in the present embodiment are coupled to each other, as shown in FIG. 4. Specifically, the case 50 in the present embodiment is made by folding a rectangular film consisting of a sheet of composite packaging film, on a fold line X3-X3 in FIG. 4, superimposing a set of opposed edges of the rectangular film (edge 51B of the first film 51 and edge 52B of the second film 52 in the drawing) on each other, and bonding them to each other with an adhesive or by heat sealing. Partial region 51A in FIGS. 3 and 4 and partial region 52A in FIG. 4 indicate regions that are not bonded with an adhesive or by heat sealing in the first film 51 and the second film 52, respectively.

The first film 51 and the second film 52 indicate respective portions of a sheet of rectangular film having mutually facing surfaces made by folding the film as described above. In the present specification, the respective edges of the first film 51 and the second film 52 after bonded will be referred to as "sealed portions."

This eliminates a need for providing the region along the fold line X3-X3 with a sealed portion for joining between the first film 51 and the second film 52, and thus reduces the number of sealed portions in the case 50. As a result, it further increases the volume energy density based on the volume of the space in which the lithium-ion secondary battery 1 is to be installed.

In the present embodiment, as shown in FIGS. 3 and 4, one end of the anode lead 12 connected to the anode 10 and one end of the cathode lead 22 connected to the cathode 20 are arranged so as to project outward from the sealed portion in which the aforementioned edge 51B of the first film 51 and edge 52B of the second film 52 are joined together.

The film forming the first film 51 and the second film 52 is a flexible film. Since the film is lightweight and easy to be thinned, the lithium-ion secondary battery itself can be formed in a low profile. For this reason, it is easy to increase the original volume energy density and also to increase the volume energy density based on the volume of the space in which the lithium-ion secondary battery is to be installed.

There are no particular restrictions on this film as long as it is a flexible film. The film is preferably a "composite packaging film" having at least an innermost layer of a polymer in contact with a power-generating element 60, and a metal layer located on the side opposite to the side where the innermost layer is in contact with the power-generating element, from the viewpoints of ensuring sufficient mechanical strength and lightweight property of the case and effectively preventing intrusion of water and air from the outside of the case 50 into the inside of the case 50 and escape of the electrolyte component from the inside of the case 50 to the outside of the case 50.

Figure 8:
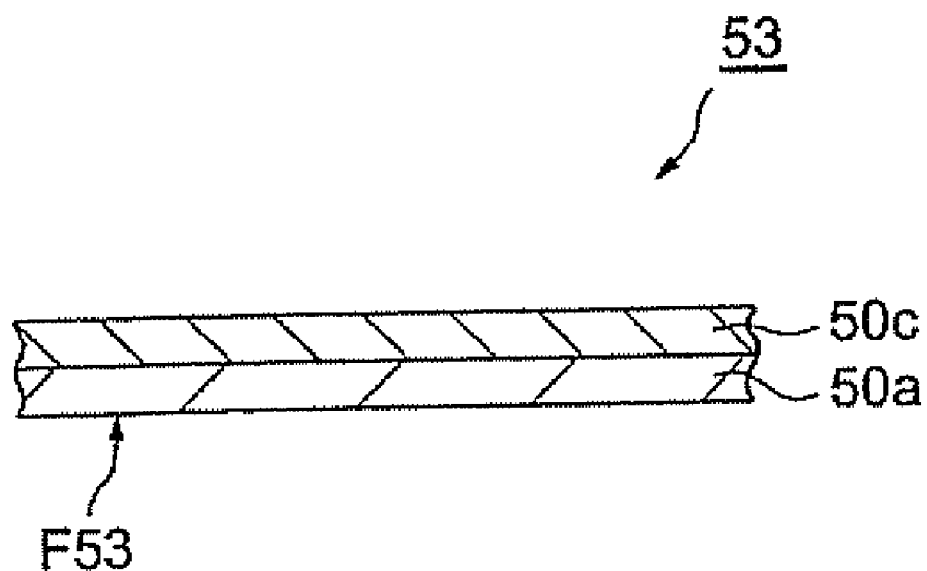
FIG. 8 is a schematic sectional view showing an example of a basic configuration of a film as a constituent material of a case in the lithium-ion secondary battery shown in FIG. 3.
Figure 9:
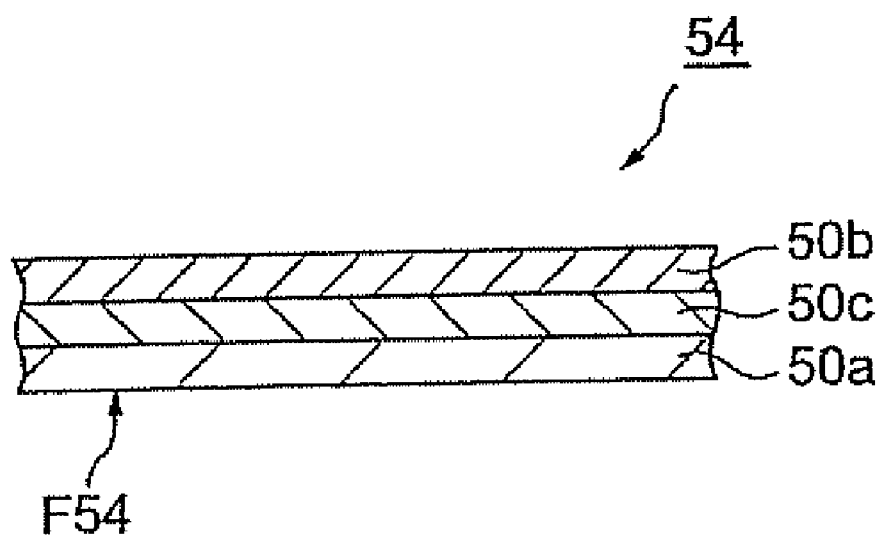
FIG. 9 is a schematic sectional view showing another example of the basic configuration of the film as a constituent material of the case in the lithium-ion secondary battery shown in FIG. 3.

The composite packaging film applicable as the first film 51 and second film 52 can be, for example, a composite packaging film in one of structures shown in FIG. 8 and FIG. 9. The composite packaging film 53 shown in FIG. 8 has an innermost layer 50a of a polymer with an inner surface F53 in contact with the power-generating element 60, and a metal layer 50c disposed on the other surface (outer surface) of the innermost layer 50a. The composite packaging film 54 shown in FIG. 9 has a structure in which an outermost layer 50b of a polymer is further disposed on the outer surface of the metal layer 50c in the composite packaging film 53 shown in FIG. 8.

There are no particular restrictions on the composite packaging film applicable as the first film 51 and second film 52 as long as it is a composite packaging material having two or more layers including at least one polymer layer, e.g., the innermost layer, and the metal layer of metal foil or the like. From the viewpoint of achieving the same effect as above more definitely, the composite packaging film is more preferably composed of three or more layers including the innermost layer 50a, the outermost layer 50b of a polymer disposed on the outer surface side of the case 50 farthest from the innermost layer 50a, and at least one metal layer 50c disposed between the innermost layer 50a and the outermost layer 50b as in the composite packaging film 54 shown in FIG. 9.

The innermost layer 50a is a layer with flexibility and there are no particular restrictions on a constituent material thereof as long as it is a polymer that can exhibit the aforementioned flexibility and that has chemical stability (resistance to chemical reaction, dissolution, and swelling) to the nonaqueous electrolyte solution used and chemical stability to oxygen and water (water in air). However, the constituent material is preferably a material with low permeability for oxygen, water (water in air), and the components of the nonaqueous electrolyte solution. The material can be selected, for example, from engineering plastics and thermoplastic resins such as polyethylene, polypropylene, acid-modified polyethylene, acid-modified polypropylene, polyethylene ionomer, and polypropylene ionomer.

The "engineering plastics" means plastics with excellent mechanical characteristics, thermal resistance, and endurance as used in mechanical components, electrical components, residential materials, etc., and examples thereof include polyacetal, polyamide, polycarbonate, poly(oxyetramethylene-oxyterephthaloyl) (polybutylene terephthalate), polyethylene terephlthalate, polyimide, and polyphenylene sulfide.

When a polymer layer like the outermost layer 50b is further provided in addition to the innermost layer 50a as in the composite packaging film 54 shown in FIG. 9, this polymer layer may be made using a constituent material similar to the innermost layer 50a.

The metal layer 50c is preferably a layer made of a metal material with corrosion resistance to oxygen, water (water in air), and the nonaqueous electrolyte solution. For example, the metal layer 50c may be made of a metal foil of aluminum, an aluminum alloy, titanium, or chromium.

There are no particular restrictions on how to seal all the sealed portions in the case 50, but the heat sealing method is preferably applicable in terms of productivity.

As shown in FIGS. 3 and 4, the portion of the anode lead 12 in contact with the sealed portion of the exterior bag consisting of the edge 51B of the first film 51 and the edge 52B of the second film 52 is covered by an insulator 14 for preventing contact between the anode lead 12 and the metal layer in the composite packaging film forming each film. Furthermore, the portion of the cathode lead 22 in contact with the sealed portion of the exterior bag consisting of the edge 51B of the first film 51 and the edge 52B of the second film 52 is covered by an insulator 24 for preventing contact between the cathode lead 22 and the metal layer in the composite packaging film forming each film.

There are no particular restrictions on configurations of these insulators 14 and 24, but each of them may be made, for example, of a polymer. It is also possible to adopt a configuration without these insulators 14 and 24 if the contact of the metal layer in the composite packaging film is adequately prevented to each of the anode lead 12 and the cathode lead 22.

Next, the aforementioned lithium-ion secondary battery 1 can be produced, for example, according to the following procedure. First, the anode lead 12 and the cathode lead 22 are electrically connected to the anode 10 and to the cathode 20, respectively. Thereafter, the separator 40 is placed in contact between the anode 10 and the cathode 20 (preferably, in a non-bonded state), thereby completing the power-generating element 60.

Then the case 50 is produced, for example, according to the following method. First, where the first film and the second film are made of the aforementioned composite packaging film, the film is produced by one of the known methods such as dry lamination, wet lamination, hot melt lamination, and extrusion lamination. Prepared are a film for the polymer layer, and a metal foil of aluminum or the like, which constitute the composite packaging film. The metal foil can be prepared for example, by rolling a metal material.

Next, the composite packaging film (multilayered film) is produced, preferably, in the aforementioned structure of plural layers, for example, by bonding the metal foil onto the film for the polymer layer with an adhesive. Then the composite packaging film is cut in predetermined size to prepare a sheet of rectangular film.

Next, as described above with reference to FIG. 4, the sheet of film is folded and the sealed portion 51B (edge 51B) of the first film 51 and the sealed portion 52B (edge 52B) of the second film 52 are heat-sealed in a desired seal width under a predetermined heat condition, for example, with a sealing machine. At this time, the film is left without being heat-sealed in part, in order to secure an aperture for introducing the power-generating element 60 into the case 50. This obtains the case 50 in a state with the aperture.

Then the power-generating element 60 with the anode lead 12 and the cathode lead 22 being electrically connected thereto is put into the interior of the case 50 with the aperture. Then the electrolyte solution is poured into the interior. Subsequently, the aperture of the case 50 is sealed with a sealing machine in a state in which the anode lead 12 and the cathode lead 22 each are inserted in part in the case 50. The case 50 and the lithium-ion secondary battery 1 are completed in this manner. It should be noted that the lithium-ion secondary battery of the present invention is not limited to the shape but may also be formed in any other shape such as a cylindrical shape.

The above detailed the preferred embodiment of the lithium-ion secondary battery of the present invention, but the present invention is by no means intended to be limited to the above embodiment. For example, in the description of the above embodiment, the sealed portions of the lithium-ion secondary battery 1 may be folded to achieve a more compact structure. The above embodiment described the lithium-ion secondary battery 1 with one each of the anode 10 and cathode 20, but the lithium-ion secondary battery may be constructed in a configuration wherein there are two or more of each of the anode 10 and cathode 20 and wherein a separator 40 is always located between the anode 10 and cathode 20.

The present invention will be described below in more detail on the basis of examples and comparative examples.

EXAMPLE 1

90 parts by mass of graphite (average particle size: 24 μm) as an anode active material, 2 parts by mass of acetylene black as a conductive aid, and 8 parts by mass of polyvinylidene fluoride (PVdF) as a binder were mixed and dispersed with a planetary mixer and thereafter the viscosity of the mixture was adjusted with an appropriate amount of NMP to obtain a coating solution for formation of the lower layer in the form of a slurry.

The coating solution for formation of the lower layer thus obtained was applied onto a copper foil (15 μm) as a current collector by the doctor blade method so as to achieve an active material-supported amount of 10.5 mg/cm$^2$, and was then dried. The resultant anode sheet was pressed by calendering under the linear pressure of 3432 N/cm (350 kgf/cm). This resulted in forming the lower layer on the current collector.

Furthermore, 90 parts by mass of graphite (average particle size: 14 μm) as an anode active material, 2 parts by mass of acetylene black as a conductive aid, and 8 parts by mass of polyvinylidene fluoride (PVdF) as a binder were mixed and dispersed with a planetary mixer and thereafter the viscosity of the mixture was adjusted with an appropriate amount of NMP to obtain a coating solution for formation of the outermost layer in the form of a slurry.

The coating solution for formation of the outermost layer thus obtained was applied onto the aforementioned lower layer by the doctor blade method so as to achieve an active material-supported amount of 2.4 mg/cm$^2$, and was dried. The resultant anode sheet was pressed by calendering under the linear pressure of 1275 N/cm (130 kgf/cm). This resulted in forming the outermost layer on the lower layer. In the anode sheet after the press, the thickness of the outermost layer was 18 μm and the thickness of the lower layer 63 μm. The anode sheet after the press was punched in the size of 31 mm×41.5 mm to obtain a desired anode.

EXAMPLE 2

An anode was produced in the same manner as in Example 1, except that the linear pressure was 393 N/cm (40 kgf/cm) in the press by calendering of the anode sheet for formation of the outermost layer. In the anode sheet after the press, the thickness of the outermost layer was 20 μm and the thickness of the lower layer 63 μm.

EXAMPLE 3

An anode was produced in the same manner as in Example 1, except that the linear pressure was 2746 N/cm (280 kgf/cm) in the press by calendering of the anode sheet for formation of the outermost layer. In the anode sheet after the press, the thickness of the outermost layer was 16 μm and the thickness of the lower layer 61 μm.

EXAMPLE 4

An anode was produced in the same manner as in Example 1, except that the linear pressure was 2942 N/cm (300 kgf/cm) in the press by calendering of the anode sheet for formation of the outermost layer. In the anode sheet after the press of the outermost layer, the thickness of the outermost layer was 19 μm and the thickness of the lower layer 67 μm.

EXAMPLE 5

An anode was produced in the same manner as in Example 1, except that the linear pressure was 3825 N/cm (390 kgf/cm) in the press by calendering of the anode sheet for formation of the outermost layer. In the anode sheet after the press of the outermost layer, the thickness of the outermost layer was 18 μm and the thickness of the lower layer 62 μm.

EXAMPLE 6

An anode was produced in the same manner as in Example 1, except that the average particle size of the anode active material (graphite) for the outermost layer was 5 μm and the active material-supported amount of the outermost layer was 0.7 mg/cm$^2$. In the anode sheet after the press of the outermost layer, the thickness of the outermost layer was 5 μm and the thickness of the lower layer 65 μm.

EXAMPLE 7

An anode was produced in the same manner as in Example 1, except that the active material-supported amount of the lower layer was 5.6 mg/cm$^2$ and the active material-supported amount of the outermost layer was 5.3 mg/cm$^2$. In the anode sheet after the press of the outermost layer, the thickness of the outermost layer was 40 μm and the thickness of the lower layer 41 μm.

EXAMPLE 8

An anode was produced in the same manner as in Example 1, except that the active material-supported amount of the lower layer was 13.7 mg/cm$^2$. In the anode sheet after the press of the outermost layer, the thickness of the outermost layer was 18 μm and the thickness of the lower layer 100 μm.

COMPARATIVE EXAMPLE 1

90 parts by mass of graphite (average particle size: 24 μm) as an anode active material, 2 parts by mass of acetylene black as a conductive aid, and 8 parts by mass of polyvinylidene fluoride (PVDF) as a binder were mixed and dispersed with a planetary mixer and thereafter the viscosity of the mixture was adjusted with an appropriate amount of NMP to obtain a coating solution in the form of a slurry.

The coating solution thus obtained was applied onto a copper foil (15 μm) as a current collector by the doctor blade method so as to achieve an active material-supported amount of 11 mg/cm$^2$, and was dried. This resulted in obtaining an anode sheet in which the anode active material-containing layer was formed on the current collector. The resultant anode sheet was pressed by calendering under the linear pressure of 1569 N/cm (160 kgf/cm). The thickness of the anode active material-containing layer after the press was 81 μm. The anode sheet after the press was punched in the size of 31 mm×41.5 mm to obtain a desired anode.

COMPARATIVE EXAMPLE 2

An anode was produced in the same manner as in Comparative Example 1, except that the linear pressure during the press by calendering was 2648 N/cm (270 kgf/cm). The thickness of the anode active material-containing layer after the press was 74 μm.

COMPARATIVE EXAMPLE 3

An anode was produced in the same manner as in Comparative Example 1, except that the linear pressure during the press by calendering was 3138 N/cm (320 kgf/cm). The thickness of the anode active material-containing layer after the press was 72 μm.

COMPARATIVE EXAMPLE 4

An anode was produced in the same manner as in Comparative Example 1, except that the linear pressure during the press by calendering was 3923 N/cm (400 kgf/cm). The thickness of the anode active material-containing layer after the press was 62 μm.

<Measurement of Degree of Flexion>

Figure 11:
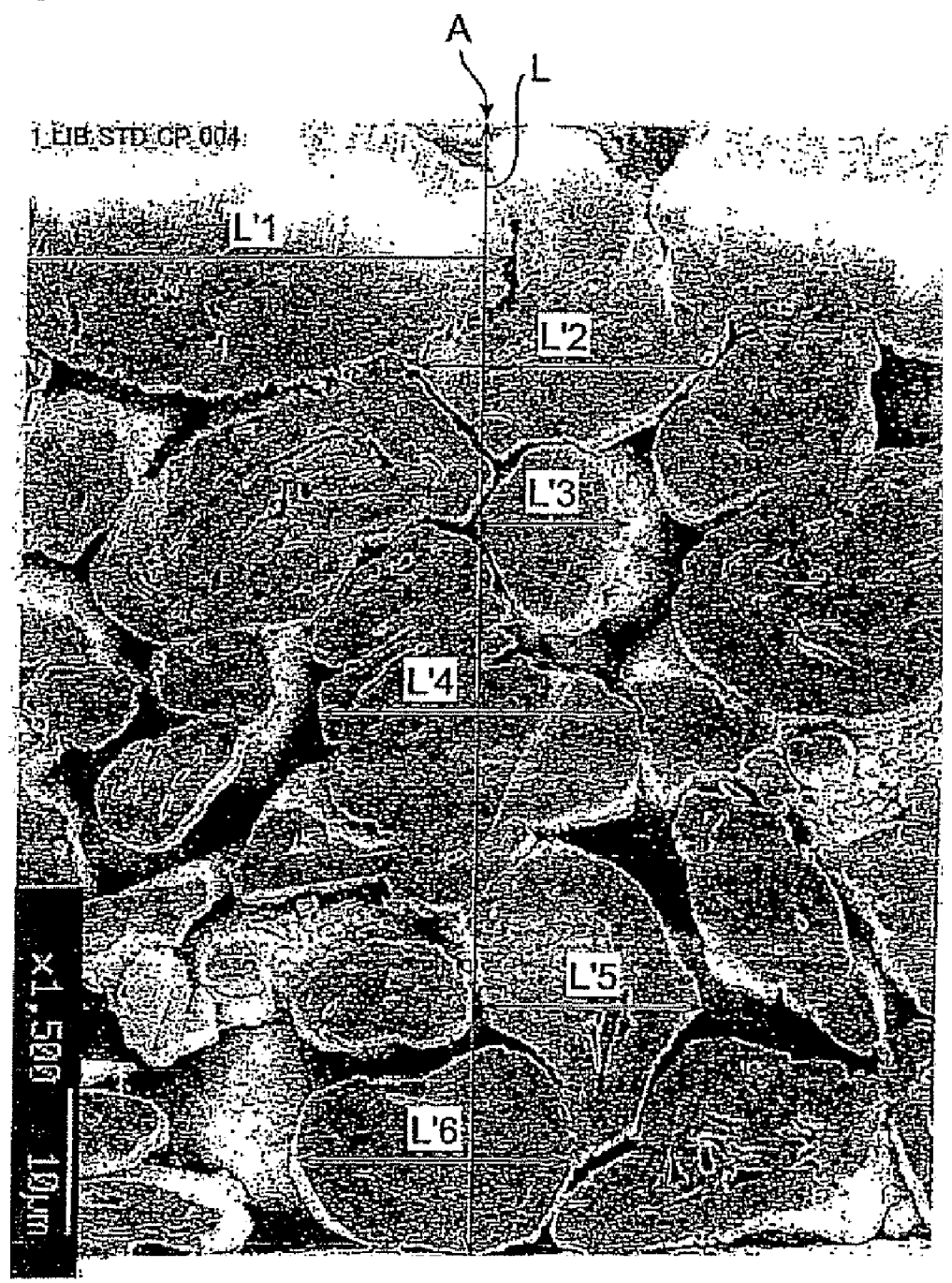
FIG. 11 is an SEM photograph (magnification: ×1500; field: 65 μm×80 μm) of a cross section of an anode active material-containing layer in the anode in Comparative Example 1.

With each of the anodes obtained in Examples 1-8 and Comparative Examples 1-4, the degree of flexion was determined from SEM images of cross sections of the anode active material-containing layer. FIG. 11 is an SEM photograph (magnification: ×1500) of a cross section of the anode active material-containing layer in the anode of Comparative Example 1. As shown in FIG. 11, a straight line A was drawn perpendicularly to the anode active material-containing layer (or in parallel with the direction of thickness of the anode active material-containing layer) in the center of the taken SEM photograph, measurement of lengths was conducted to obtain the length L of the straight line A and the value L' (L'1+L'2+L'3+L'4+L'5+L'6) as the sum of lateral maximum diameters of active material particles 15 crossing the straight line A, and the value of (L'/L) was calculated. Similarly, a total of ten SEM photographs were taken for cross sections of the anode active material-containing layer in the anode of Comparative Example 1, and an average of values of (L'/L) measured from the respective SEM photographs was defined as the degree of flexion. The degree of flexion was also determined by the same technique, for the other examples and comparative examples. In each of the examples, the degree of flexion was determined for each of the lower layer and the outermost layer. The magnification of SEM photographs in the measurement of the degree of flexion was not limited to ×1500, but was properly increased or decreased for easier determination of L' and L. The results are presented in Table 1.

<Measurement of Density of Active Material-Containing Layer>

The apparent density (g/cm³) of the anode active material-containing layer in each of the anodes of Examples 1-8 and Comparative Examples 1-4 was calculated from the mass, thickness, and area of the anode active material-containing layer (the total of the lower layer and the outermost layer). The results are presented in Table 1.

<Measurement of Discharge Rate Performance>

An electrode evaluation cell was produced according to the following procedure, using each of the anodes obtained in Examples 1-8 and Comparative Examples 1-4. Specifically, the anode and a Li foil (100 μm thick) as a counter electrode were stacked with the separator of polyethylene in between them, to obtain a laminate (element body). This laminate was put into an aluminum laminate package, 1M LiPF$_6$/PC as an electrolyte solution was poured into this aluminum laminate package, and it was sealed in vacuum to produce the electrode evaluation cell (48 mm long, 34 mm wide, and 2 mm thick). With the electrode evaluation cell thus obtained, constant-current discharge was conducted at the discharge temperature of 25° C. A current value to a discharge end in 5 hours was defined as 0.2C and a discharge capacity at that time as 0.2C capacity. A percentage (%) of 3C capacity was determined relative to 0.2C capacity as 100%. The results are presented in Table 1.

As shown in Table 1, Comparative Examples 3 and 4 with the high degree of flexion demonstrate poor discharge rate performance and tend to cause the generation of dendrites. On the other hand, Comparative Examples 1 and 2 have the low degree of flexion and good discharge rate performance, but the low degree of flexion tends to result in low coating density and small electric capacity. It is thus difficult to produce a desired electrode from the single-layer electrodes as shown in Comparative Examples 1-4.

When the active material-containing layer of the anode is formed using the layer with the large degree of flexion and large electric capacity as the lower layer and the layer with the small degree of flexion and capability of suppressing the generation of dendrites, as the outermost layer as in Examples 1 to 8, the lithium-ion secondary battery has a good electric capacity and the generation of dendrites is suppressed well, so as to achieve excellent safety and high-rate discharge performance.

What is claimed is:

1. An anode for a lithium-ion secondary battery comprising a current collector, and an active material-containing layer formed on the current collector,
    wherein the active material-containing layer is comprised of an outermost layer disposed on the farthest side from the current collector, and a lower layer composed of at least one layer disposed between the outermost layer and the current collector, the outermost layer having a structure in which active material particles are bound by a binder and the lower layer having a structure in which active material particles are bound by a binder, and
    wherein a degree of flexion of the outermost layer is smaller than a degree of flexion of the lower layer, the degree of flexion of the outermost layer and the degree of flexion of the lower layer being defined as a ratio: L'/L,
    where L is a thickness of a layer, which is any of the outermost layer and the lower layer, obtained by drawing a straight line A perpendicular to the layer, and
    L' is a numerical value, in the same unit as L, of a sum of maximum diameters of active material particles crossing the straight line A in a lateral direction perpendicular to the straight line A.

2. The anode according to claim 1, wherein the degree of flexion of the outermost layer is not less than 1.3 nor more than 2.0.

TABLE 1

|  | Degree of flexion of outermost layer | Degree of flexion of lower layer | Thickness of outermost layer [μm] | Thickness of lower layer [μm] | Density of active material-containing layer [g/cm³] | Discharge rate performance (3 C/0.2 C) [%] |
|---|---|---|---|---|---|---|
| Example 1 | 1.6 | 3.6 | 18 | 63 | 1.69 | 59 |
| Example 2 | 1.3 | 3.6 | 20 | 63 | 1.61 | 62 |
| Example 3 | 2.0 | 3.8 | 16 | 61 | 1.73 | 54 |
| Example 4 | 1.6 | 2.5 | 19 | 67 | 1.62 | 59 |
| Example 5 | 1.6 | 4.0 | 18 | 62 | 1.70 | 54 |
| Example 6 | 1.6 | 3.6 | 5 | 65 | 1.72 | 55 |
| Example 7 | 1.6 | 3.6 | 40 | 41 | 1.60 | 63 |
| Example 8 | 1.6 | 3.6 | 18 | 100 | 1.75 | 53 |
| Comparative Example 1 | — | 1.7 | — | 81 | 1.44 | 60 |
| Comparative Example 2 | — | 2.0 | — | 74 | 1.57 | 59 |
| Comparative Example 3 | — | 3.2 | — | 72 | 1.69 | 51 |
| Comparative Example 4 | — | 4.4 | — | 62 | 1.79 | 46 |

3. The anode according to clam 2, wherein the degree of flexion of the lower layer is not less than 2.5 nor more than 4.0.

4. The anode according to claim 3, wherein a thickness of the outermost layer is smaller than a thickness of the lower layer.

5. The anode according to claim 4, wherein the thickness of the outermost layer is not less than 5 μm nor more than 40 μm and wherein the thickness of the lower layer is not less than 40 μm nor more than 100 μm.

6. The anode according to claim 2, wherein a thickness of the outermost layer is smaller than a thickness of the lower layer.

7. The anode according to claim 6, wherein the thickness of the outermost layer is not less than 5 μm nor more than 40 μm and wherein the thickness of the lower layer is not less than 40 μm nor more than 100 μm.

8. The anode according to claim 1, wherein the degree of flexion of the lower layer is not less than 2.5 nor more than 4.0.

9. The anode according to claim 8, wherein a thickness of the outermost layer is smaller than a thickness of the lower layer.

10. The anode according to claim 9, wherein the thickness of the outermost layer is not less than 5 μm nor more than 40 μm and wherein the thickness of the lower layer is not less than 40 μm nor more than 100 μm.

11. The anode according to claim 1, wherein a thickness of the outermost layer is smaller than a thickness of the lower layer.

12. The anode according to claim 11, wherein the thickness of the outermost layer is not less than 5 μm nor more than 40 μm and wherein the thickness of the lower layer is not less than 40 μm nor more than 100 μm.

13. A lithium-ion secondary battery comprising an anode, a cathode, and an electrolyte layer disposed between the anode and the cathode, wherein said anode is the anode as set forth in claim 1.

* * * * *